US012511169B2

United States Patent
Bhargava et al.

(10) Patent No.: US 12,511,169 B2
(45) Date of Patent: Dec. 30, 2025

(54) MESSAGE PARSING TO DETERMINE CROSS-APPLICATION DEPENDENCIES AMONG ACTIONS FROM DIFFERENT APPLICATIONS

(71) Applicant: Dell Products L.P., Round Rock, TX (US)

(72) Inventors: Vivek Bhargava, Bangalore (IN); Vaideeswaran Ganesan, Bengaluru (IN); Rishav Sethia, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 697 days.

(21) Appl. No.: 17/869,295

(22) Filed: Jul. 20, 2022

(65) Prior Publication Data

US 2024/0028413 A1    Jan. 25, 2024

(51) Int. Cl.
G06F 9/50    (2006.01)
G06F 9/38    (2018.01)
G06F 40/289    (2020.01)

(52) U.S. Cl.
CPC .......... G06F 9/5066 (2013.01); G06F 9/3838 (2013.01); G06F 40/289 (2020.01)

(58) Field of Classification Search
None
See application file for complete search history.

(56) References Cited

U.S. PATENT DOCUMENTS

2015/0278219 A1* 10/2015 Phipps ................ G06F 16/2358
  707/711
2020/0218580 A1* 7/2020 Kim ...................... G06F 9/5072

OTHER PUBLICATIONS

C. Mathers, "The Learning Retention Pyramid: A Simple Guide," https://www.developgoodhabits.com/learning-pyramid/, Apr. 1, 2020, 18 pages.
M. Zaib et al., "A Short Survey of Pre-trained Language Models for Conversational AI—A New Age in NLP," Association for Computing Machinery, arXiv:2104.10810v1, Apr. 22, 2021, 7 pages.
(Continued)

*Primary Examiner* — Chat C Do
*Assistant Examiner* — William C Wood
(74) *Attorney, Agent, or Firm* — Ryan, Mason & Lewis, LLP

(57) ABSTRACT

An apparatus comprises a processing device configured to obtain messages associated with actions taken in applications running on at least one information technology asset in an information technology infrastructure, and to parse the messages to create message records, a given message record associated with a given message identifying actions taken in a given one of the applications, entities for which the actions in the given application were performed, and topics that the given message is associated with. The processing device is also configured to determine cross-application dependencies between the actions based at least in part on correlating entities and topics across the message records, a given cross-application dependency characterizing a relationship between first and second actions taken in first and second ones of the applications. The processing device is further configured to control performance of subsequent actions in the applications based at least in part on the determined cross-application dependencies.

20 Claims, 13 Drawing Sheets

(56) References Cited

OTHER PUBLICATIONS

L. P. Kaelbling et al., "Reinforcement Learning: A Survey," Journal of Artificial Intelligence Research, vol. 4, May 1996, pp. 237-285.
J. Pensar et al., "Labeled Directed Acyclic Graphs: A Generalization of Context-Specfic Independence in Directed Graphical Models," arXiv:1310.1187v1, Oct. 4, 2013, 26 pages.
J. Gao et al., "Neural Approaches to Conversational AI," Foundations and Trends in Information Retrieval, vol. 13, No. 2-3, Feb. 21, 2019, 64 pages.
M. Zaib et al., "Conversational Question Answering: A Survey," arXiv:2106.00874v2, Jun. 3, 2021, 46 pages.
P. Bhagat et al., "Initial Lessons from Building an IVR-based Automated Question-Answering System," International Conference on Information and Communication Technologies and Development, Jun. 17-20, 2020.
Dell Inc., "Dell Compellent Copilot Optimize Service," Copilot Optimize v1.1, Jun. 7, 2012, 7 pages.
Dell Technologies, "Apex," Brochure, Jul. 2020, 9 pages.
Dell Inc., "Dell Compellent Copilot Support," D344 Rev. 2.1, Dec. 2013, 3 pages.
A. Hauser et al., "Characterization and Greedy Learning of Interventional Markov Equivalence Classes of Directed Acyclic Graphs," Journal of Machine Learning Research, vol. 13, Aug. 2012, pp. 2409-2464.
Dell Technologies, "Dell CloudIQ: A Detailed Review," Technical White Paper, Jan. 2022, 159 pages.
P. M. Nadkarni et al., "Natural Language Processing: An Introduction," Journal of the American Medical Informatics Association, vol. 18, No. 5, Sep. 2011, pp. 544-551.
Penn Treebank, "Alphabetical List of Part-of-speech Tags Used in the Penn Treebank Project," https://www.ling.upenn.edu/courses/Fall_2003/ling001/penn_treebank_pos.html, Accessed Jul. 19, 2022, 1 page.
M. Oshry et al., "Voice Extensible Markup Language (VoiceXML) 2.1," https://www.w3.org/TR/2007/REC-voicexml21-20070619/, Jun. 19, 2007, 25 pages.
J. Jablonski, "Natural Language Processing with Python's NLTK Package," https://realpython.com/nltk-nlp-python/, Accessed Jul. 19, 2022, 25 pages.

\* cited by examiner

| TIMESTAMP | NOUN PHRASE | VERB PHRASE | APPLICATION | ENTITY | TOPIC |
|---|---|---|---|---|---|
| 2022-02-29 T18:30:55-0600 | PRODUCT | LAUNCHED | SALES APPLICATION 1 | PRODUCT A | PRODUCT TYPE A |
| 2022-03-02 T19:07:08-0600 | PRODUCT BRIEF | RELEASED | SALES APPLICATION 1 | PRODUCT A | PRODUCT TYPE A |
| 2022-03-15 T19:08:36-0600 | COMPETITION | SEARCH | SALES APPLICATION 2 | PRODUCT A | PRODUCT TYPE A |
| 2022-03-15 T19:15:20-0600 | AWARDS | SEARCH | WEB BROWSER APPLICATION | PRODUCT A | PRODUCT TYPE A |
| 2022-03-20 T19:10:23-0600 | AN OPPORTUNITY RELATED TO | WAS DUE | SALES APPLICATION 3 | - | PRODUCT TYPE A |

FIG. 4

MESSAGE PARSING TO DETERMINE CROSS-APPLICATION DEPENDENCIES AMONG ACTIONS FROM DIFFERENT APPLICATIONS

FIELD

The field relates generally to information processing, and more particularly to management of information processing systems.

BACKGROUND

Support platforms may be utilized to provide various services for managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices.

SUMMARY

Illustrative embodiments of the present disclosure provide techniques for message parsing to determine cross-application dependencies among actions from different applications.

In one embodiment, an apparatus comprises at least one processing device comprising a processor coupled to a memory. The at least one processing device is configured to perform the steps of obtaining a plurality of messages, the plurality of messages being associated with a plurality of actions taken in two or more applications running on at least one information technology asset in an information technology infrastructure, and parsing the plurality of messages to create a plurality of message records, a given one of the plurality of message records associated with a given one of the plurality of messages identifying one or more actions taken in a given one of the two or more applications, one or more entities for which the one or more actions in the given application were performed, and one or more of a plurality of topics that the given message is associated with. The at least one processing device is also configured to perform the step of determining cross-application dependencies between two or more of the plurality of actions based at least in part on correlating at least one of entities and topics across two or more of the plurality of message records, a given one of the determined cross-application dependencies characterizing a relationship between a first one of the plurality of actions taken in a first one of the two or more applications and at least a second one of the plurality of actions taken in at least a second one of the two or more applications. The at least one processing device is further configured to perform the step of controlling performance of subsequent actions in at least one of the two or more applications based at least in part on the determined cross-application dependencies.

These and other illustrative embodiments include, without limitation, methods, apparatus, networks, systems and processor-readable storage media.

BRIEF DESCRIPTION OF THE DRAWINGS

FIG. 4 shows a table of metadata features for notification message from multiple applications in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
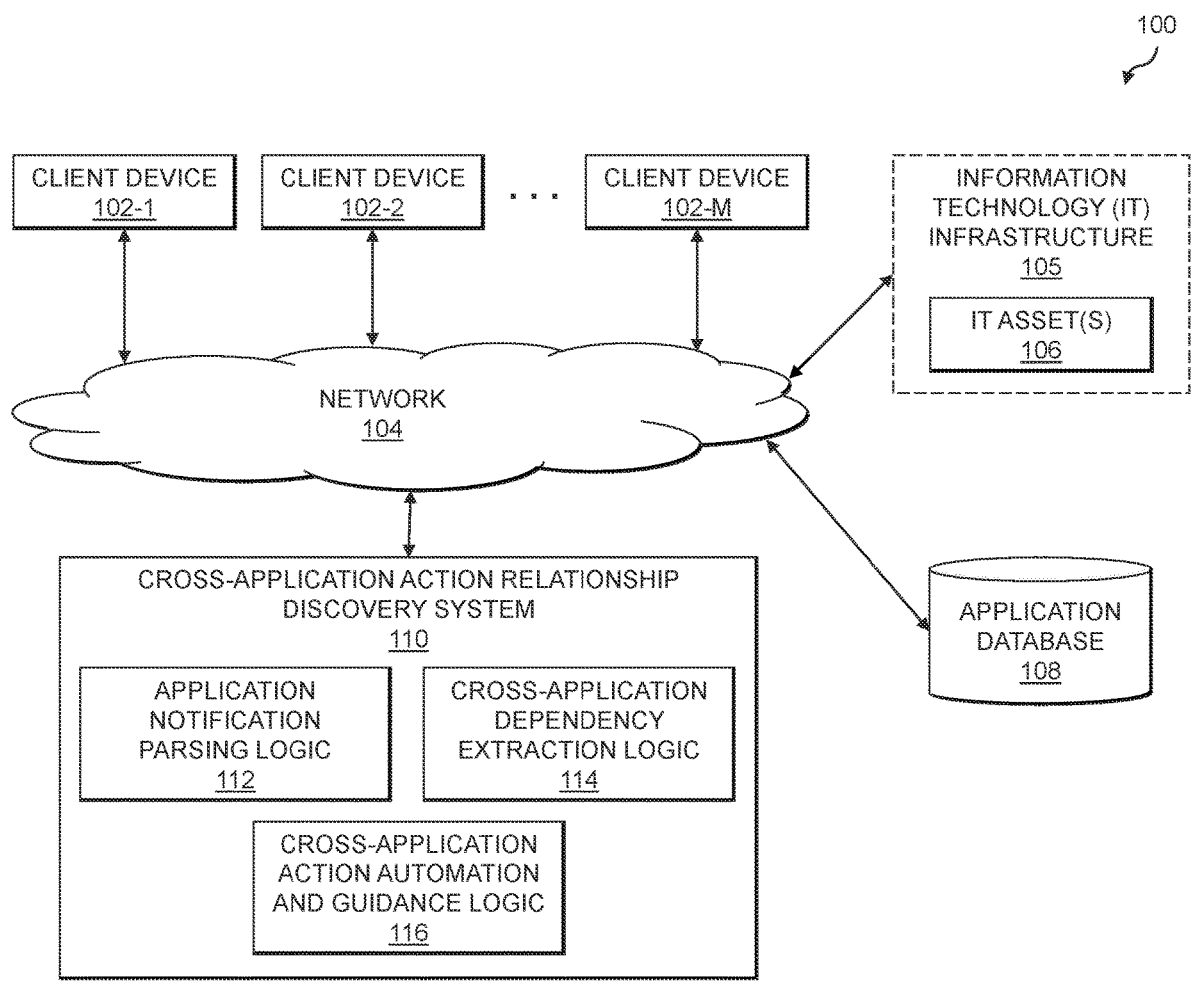
FIG. 1 is a block diagram of an information processing system configured for message parsing to determine cross-application dependencies among actions from different applications in an illustrative embodiment.

FIG. 1 shows an information processing system 100 configured in accordance with an illustrative embodiment. The information processing system 100 is assumed to be built on at least one processing platform and provides functionality for cross-application action relationship discovery. The system 100 includes a set of client devices 102-1, 102-2, . . . 102-M (collectively, client devices 102)

which are coupled to a network 104. Also coupled to the network 104 is an information technology (IT) infrastructure 105 comprising one or more IT assets 106, an application database 108, and a cross-application action relationship discovery system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The IT assets 106 of the IT infrastructure 105 may host applications that are utilized by respective ones of the client devices 102, such as in accordance with a client-server computer program architecture. In some embodiments, the applications comprise web applications designed for delivery from assets in the IT infrastructure 105 to users (e.g., of client devices 102) over the network 104. Various other examples are possible, such as where one or more applications are used internal to the IT infrastructure 105 and not exposed to the client devices 102. Further, each of the client devices 102 may run different sets of applications which are not hosted by IT assets 106 of the IT infrastructure.

The cross-application action relationship discovery system 110 utilizes various information stored in the application database 108 for detecting events or actions taken in different applications (e.g., hosted on the client devices 102, the IT assets 106, combinations thereof, etc.) and for discovering cross-application relationships between such actions. This may include parsing computer-generated notifications or messages. Such computer-generated notifications may include, for example, instructions for performing servicing, configuration or other management of the IT assets 106 in the IT infrastructures 105, by sales representatives or other users of a given enterprise, etc.

In some embodiments, the cross-application action relationship discovery system 110 is used for an enterprise system. For example, an enterprise may subscribe to or otherwise utilize the cross-application action relationship discovery system 110 for discovering relationships between actions in multiple different applications. Based on such discovered relationships, the cross-application action relationship discovery system 110 is able to automate processing of actions in different ones of the applications to assist a user in one or more desired tasks (e.g., servicing, configuration or other management of the IT assets 106, making sales pitches, etc.). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The application database 108, as discussed above, is configured to store and record various information that is used by the cross-application action relationship discovery system 110 in discovering cross-application action relationships. Such information may include, but is not limited to, information regarding previously processed notification messages, events or other actions, known cross-application action relationship patterns, etc. The application database 108 in some embodiments is implemented using one or more storage systems or devices associated with cross-application action relationship discovery system 110. In some embodiments, one or more of the storage systems utilized to implement the application database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the cross-application action relationship discovery system 110, as well as to support communication between the cross-application action relationship discovery system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105 (e.g., including performing servicing, configuration or other management of the IT assets 106, or of applications or other software that runs on the IT assets 106). For example, a given one of the client devices 102 may be operated by a user to access a graphical user interface (GUI) provided by the cross-application action relationship discovery system 110 to discover cross-application dependencies and action relationship patterns which may be used to guide further user action, for automating future actions, etc. The cross-application action relationship discovery system 110 may be provided as a cloud service that is accessible by the given client device 102 to allow the user thereof to manage cross-application action relationship discovery, and for automating or guiding user actions based on discovered cross-application action relationships. In some embodiments, the IT assets 106 of the IT infrastructure 105 are owned or operated by the same enterprise that operates the cross-application action relationship discovery system 110 (e.g., where an enterprise such as a business provides support for the assets it operates). In other embodiments, the IT assets 106 of the IT infrastructure 105 may be owned or operated by one or more enterprises different than the enterprise which operates the cross-application action relationship discovery system 110. Various other examples are possible.

In other embodiments, the cross-application action relationship discovery system 110 may provide support for a vendor that manufactures and sells various products, instead of or in addition to providing support for the IT assets 106 of the IT infrastructure 105. For example, the cross-application action relationship discovery system 110 may be operated by a vendor that manufactures and sells various products (e.g., possibly including the client devices 102 and/or the IT assets 106, or applications or other software that run on the client devices 102 and/or the IT assets 106, etc.), with the cross-application action relationship dependencies being used to guide or automate actions associated with different product launches, sales or marketing events, etc. The cross-application action relationship discovery system 110, however, is not required to be operated by any single product vendor. Instead, the cross-application action relationship discovery system 110 may be offered as a service to provide support for products that are offered by any number of product vendors. The client devices 102 may subscribe to the cross-application action relationship discovery system 110, so as to provide support for rollout of the products offered by such vendors. Various other examples are possible.

In some embodiments, the client devices 102 and/or IT assets 106 may implement host agents that are configured for automated transmission of information (e.g., computer-generated notifications) that are to be processed to determine cross-application action relationship patterns. Such host agents may also or alternatively be configured to automatically receive from the cross-application action relationship discovery system 110 instructions for guiding or automating actions based on discovered cross-application action relationship patterns. It should be noted that a "host agent" as this term is generally used herein may comprise an automated entity, such as a software entity running on a processing device. Accordingly, a host agent need not be a human entity.

The cross-application action relationship discovery system 110 in the FIG. 1 embodiment is assumed to be implemented using at least one processing device. Each such processing device generally comprises at least one processor and an associated memory, and implements one or more functional modules or logic for controlling certain features of the cross-application action relationship discovery system 110. In the FIG. 1 embodiment, the cross-application action relationship discovery system 110 comprises application notification parsing logic 112, cross-application dependency extraction logic 114, and cross-application action automation and guidance logic 116. The application notification parsing logic 112 is configured to analyze message notifications (e.g., using natural language processing (NLP)) to remove entities from the notification messages and convert the remainder of the notification messages into noun and verb phrases. The application notification parsing logic 112 is further configured to generate records for the notification messages, where the records may include various features of the notification messages (e.g., timestamps, noun phrases, verb phrases, applications, entities, topics, etc.). The cross-application dependency extraction logic 114 is configured to extract dependencies from such generated records, which may include determining pivots or transitions between applications and topics, and for determining the transition times between the applications and topics across different records (e.g., for a single user, for multiple users, across one or more sessions, etc.). The cross-application action automation and guidance logic 116 is configured to utilize the cross-application dependencies extracted from the notification messages in order to automate actions in different applications (e.g., running on the client devices 102, the IT assets 106, combinations thereof, etc.) or guide user action (e.g., via recommendations or suggestions presented in artificial intelligence (AI) guided conversation systems, etc.).

It is to be appreciated that the particular arrangement of the client devices 102, the IT infrastructure 105 and the cross-application action relationship discovery system 110 illustrated in the FIG. 1 embodiment is presented by way of example only, and alternative arrangements can be used in other embodiments. As discussed above, for example, the cross-application action relationship discovery system 110 (or portions of components thereof, such as one or more of the application notification parsing logic 112, the cross-application dependency extraction logic 114, and the cross-application action automation and guidance logic 116) may in some embodiments be implemented internal to one or more of the client devices 102 and/or the IT infrastructure 105.

At least portions of the application notification parsing logic 112, the cross-application dependency extraction logic 114, and the cross-application action automation and guidance logic 116 may be implemented at least in part in the form of software that is stored in memory and executed by a processor.

The cross-application action relationship discovery system 110 and other portions of the system 100, as will be described in further detail below, may be part of cloud infrastructure.

The cross-application action relationship discovery system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the application database 108 and the cross-application action relationship discovery system 110 or components thereof (e.g., the application notification parsing logic 112, the cross-application dependency extraction logic 114, and the cross-application action automation and guidance logic 116) may be implemented on respective distinct processing platforms, although numerous other arrangements are possible. For example, in some embodiments at least portions of the cross-application action relationship discovery system 110 and one or more of the client devices 102, the IT infrastructure 105 and/or the application database 108 are implemented on the same processing platform. A given client device (e.g., 102-1) can therefore be implemented at least in part within at least one processing platform that implements at least a portion of the cross-application action relationship discovery system 110.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the IT infrastructure 105, IT assets 106, the application database 108 and the cross-application action relationship discovery system 110, or portions or components thereof, to reside in different data centers. Numerous other distributed implementations are possible. The cross-application action relationship discovery system 110 can also be implemented in a distributed manner across multiple data centers.

Additional examples of processing platforms utilized to implement the cross-application action relationship discovery system 110 and other components of the system 100 in illustrative embodiments will be described in more detail below in conjunction with FIGS. 12 and 13.

It is to be appreciated that these and other features of illustrative embodiments are presented by way of example only, and should not be construed as limiting in any way.

It is to be understood that the particular set of elements shown in FIG. 1 for message parsing to determine cross-application dependencies among actions from different applications is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for message parsing to determine cross-application dependencies among actions from different applications will now be described in more detail with reference to the flow diagram of FIG. 2. It is to be understood that this particular process is only an example, and that additional or alternative processes for message parsing to determine cross-application dependencies among actions from different applications may be used in other embodiments.

In this embodiment, the process includes steps 200 through 206. These steps are assumed to be performed by the cross-application action relationship discovery system 110 utilizing the application notification parsing logic 112, the cross-application dependency extraction logic 114, and the cross-application action automation and guidance logic 116. The process begins with step 200, obtaining a plurality of messages, the plurality of messages being associated with a plurality of actions taken in two or more applications running on at least one IT asset (e.g., one of the IT assets 106 in IT infrastructure 105). The two or more applications may comprise two or more different enterprise applications of an enterprise operating the given IT asset.

The plurality of messages are parse in step 202 to create a plurality of message records. A given one of the plurality of message records associated with a given one of the plurality of messages identifies one or more actions taken in a given one of the two or more applications, one or more entities for which the one or more actions in the given application were performed, and one or more of a plurality of topics that the given message is associated with. The one or more entities for which the one or more actions in the given application were performed may comprise the given IT asset, and the one or more topics that the given message is associated with may comprise an asset type of the given IT asset. The plurality of messages may be associated with two or more different users running instances of the two or more applications on at least two information technology assets in the IT infrastructure.

Cross-application dependencies between two or more of the plurality of actions are determined in step 204 based at least in part on correlating at least one of entities and topics across two or more of the plurality of message records. A given one of the determined cross-application dependencies characterizes a relationship between a first one of the plurality of actions taken in a first one of the two or more applications and at least a second one of the plurality of actions taken in at least a second one of the two or more applications. In some embodiments, the plurality of message records identify times at which the plurality of actions were taken in the two or more applications and the given one of the determined cross-application dependencies further characterizing a transition time between the first action taken in the first application and at least the second action taken in at least the second application based at least in part on the identified times at which the first action and the second action were taken.

Step 204 may comprise, for the given cross-application dependency: identifying a first subset of the plurality of messages associated with at least one of a given topic and a given entity; identifying, within the first subset of the plurality of messages, a second subset of the plurality of messages having a common noun phrase; collecting verb phrases from the second subset of the plurality of messages; and generating a model for transitions between the verb phrases collected from the second subset of the plurality of messages. Generating the model for transitions between the verb phrases collected from the second subset of the plurality of messages may comprise creating a discrete time function series for modeling the transition times between the verb phrases collected from the second subset of the plurality of messages. The model for transitions between the verb phrases collected from the second subset of the plurality of messages may be further based at least in part on sentiment analysis of the verb phrases.

In some embodiments, step 204 comprises generating one or more decision trees. A given one of the decision trees characterizes, for at least one of a given topic and a given entity, how ones of the plurality of actions are performed across the two or more applications. The given decision tree may be generated for a given user. The given decision tree may alternatively comprise a comprehensive decision tree for a set of two or more users.

Figure 2:
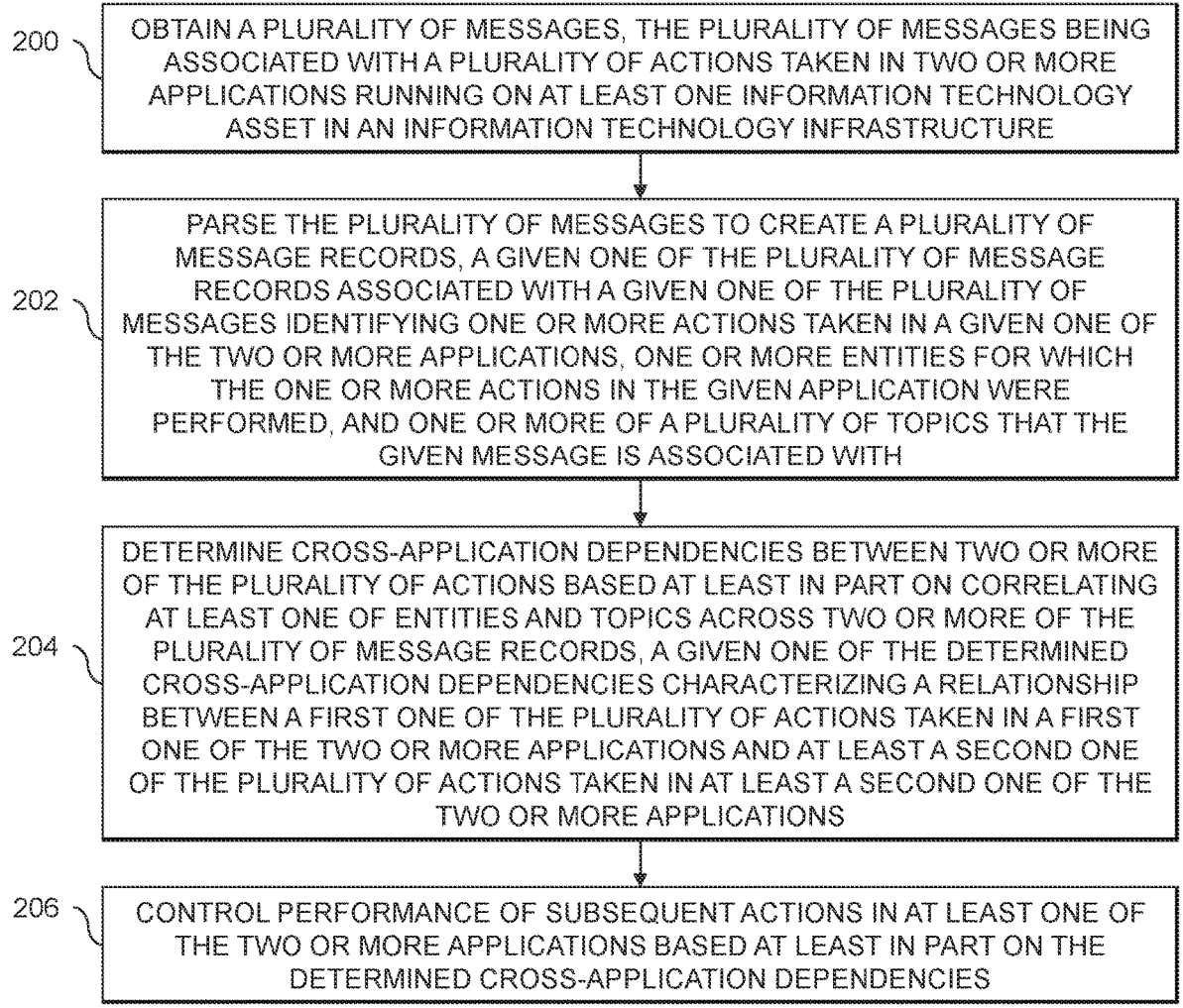
FIG. 2 is a flow diagram of an exemplary process for message parsing to determine cross-application dependencies among actions from different applications in an illustrative embodiment.

The FIG. 2 process continues with step 206, controlling performance of subsequent actions in at least one of the two or more applications based at least in part on the determined cross-application dependencies. Step 206 may comprise, responsive to detecting occurrence of an instance of the first action in the first application, generating a recommendation to perform an instance of the second action in the second application and providing the recommendation via an artificial intelligence guided conversation system. Step 206 may alternatively comprise, responsive to detecting occurrence of an instance of the first action in the first application, initiating an instance of the second action in the second application.

Currently, artifacts, notifications or other messages related to business processing and infrastructure management (e.g., message guides, recommended actions, recovery steps, business processes, escalation procedures, error messages and handling, computer-generated notifications, etc.) are all assumed to be read by humans. Thus, even with significant machine-level automation being performed inside a data center or other portion of IT infrastructure, there are many situations which still require manual human intervention.

Illustrative embodiments provide technical solutions for minimizing or reducing the need for such manual human intervention to the greatest degree possible, while keeping the sense of urgency and closure towards a desired intent to achieve desired goals as demonstrated by humans in resolving issues. When manual human intervention is required, the technical solutions described herein provide approaches for making messages or notifications to the user as clear and unambiguous as possible for the user performing the manual human intervention. This may include, for example, ensuring that messages be imperative rather than declarative or informational, reducing the usage of jargon and ambiguous words and actions, etc. The technical solutions described herein further seek manual human intervention in such a way that the manual human intervention involves just enough (e.g., as little as possible) decision making and/or action from the user performing the manual human intervention. In these cases, it is assumed that a system has the knowledge of what needs to be done in order to guide the user towards successful resolution of issues.

In some cases, a user installs various applications from an enterprise suite of applications on their devices. The technical solutions described herein can detect one or more events on a first one of such applications and, based on such detection, can recognize and discover appropriate actions to take. Such actions may be taken on the same application (e.g., the first application), on other ones of the applications (e.g., at least a second one of the applications different than the first application), combinations thereof, etc. Consider, for example, a user researching a competitive landscape in an enterprise sales application after receiving a product launch notification on an internal enterprise communication application. Advantageously, the technical solutions described herein enable a system to understand the intent and behavior of a user based on the detected events, and to automate performance of as many operations as possible to pre-enable the user with the data they need (e.g., without requiring the user to manually perform those operations).

A goal in some embodiments is to process notifications and other messages from machines (e.g., IT assets) to discover human activities, and to use the knowledge of such human activities to take actions in response (e.g., to those messages, in response to detecting the same or similar messages in the future, etc.). Various embodiments are described below with respect to a suite of enterprise applications including: a first sales application that contains product specification sheets, brochures, sales pitch materials, etc.; a second sales application that provides a dashboard view for a particular sales representative (e.g., including information such as sales opportunities, sales representative targets, what has been done to date by a particular sales representative, etc.); and a third sales application the includes information regarding previous targets (e.g., previous years' targets), workload discoveries, etc. that enable discovery of new opportunities across a sales community. In addition, some non-enterprise specific applications may be analyzed, such as activity from one or more web browser applications.

Different sales representatives of an enterprise may use the suite of enterprise applications in different ways. For example, a sales representative may leverage announcements from the first sales application to collect more competitive or descriptive material from the Internet (e.g., that is not published internally by the enterprise). Further, sales opportunities identified from the third sales application may be cross-verified using the first sales application (e.g., to look for specific materials that help address a given sales opportunity).

The technical solutions described herein provide various advantages, including for improving productivity, discovering and automating tasks, automating workflow creation, etc. Users may receive a significant number of notifications which need to be periodically pruned (e.g., to avoid creating a large backlog of notifications to be cleaned up). The automated analysis described herein can facilitate such pruning, thereby improving productivity. Further, users often perform some routine tasks when they receive certain notifications. For example, when a product of interest to a specific user is launched, that user may look for competitive analysis or acquire knowledge about the domain. The technical solutions described herein can learn these tasks to help the user with those details of interest for a specific user persona (e.g., without that user's intervention). In many situations, notifications from one application can trigger operations on other applications. The technical solutions described herein are able to discover these operations and help create workflows for users automatically (e.g., raising a service ticket and getting automatic approval for part replacement, downloading sales material as well as competitive analysis for newly launched consumer products for consumer sales personnel, etc.).

Application action discovery will now be described. Action discovery may include tracking all notifications or messages, as well as actions from all applications installed on user devices (e.g., including an enterprise suite of applications, as well as other non-enterprise specific applications such as web browser applications, office and other text processing tools, etc.). The tracking may be implemented by: registering with device operating system (OS) notification channels, and listening to all the messages coming from all the applications; using plugins to OS graphical user interface (GUI) software development kits (SDKs) to intercept controls and find the data that is entered by the user, keeping controls or other useful information (e.g., username, location, phone number, alternate contact number, address for communication, subscriptions, etc.); using plugins to log storage where the applications save their historical log information (e.g., if possible, finding a mechanism to increase or decrease the log level).

The available applications on the user devices may be classified into common categories (e.g., finance or payment applications, web browser applications, etc.). This enables actions taken on one product to be extended to other products as well. For some standard set of operations (e.g., pay money, search, etc.), there may be common application programming interfaces (APIs) that can work across the applications. The messages are then parsed to create records. In some embodiments, message parsing includes using natural language processing (NLP) to identify one or more noun phrases (e.g., parts of the message prior to a verb) and one or more verb phrases (e.g., containing the verb and other parts of the message). If there are certain identifiers (e.g., account identifier (ID), username, etc.), they may be extracted separately. These identifiers can be built by looking for certain patterns in the messages. The verb phrases are observed and associated with broad-based topics. For example, a notification or message may be associated with a product, a strategy, a monetary transaction, etc. When users are searching for terms, they are categorized according to the topic being searched. It should be noted that different technologies may use distinctive terms (e.g., especially verbs) unambiguously. By observing those verbs, it is possible to associate them with the specific technology. A record is then created with the timestamp, identifiers, noun phrase, verb phrase, topic and other features.

Topic-based action pattern discovery will now be described. Records, which are created as described above, may be grouped according to topics. Next, the records may be grouped with respect to noun phrases within a given topic. Next, the verb phrases are collected (e.g., where the verb phrases represent action transitions). Patterns are then learned (e.g., of when a verb phrase occurs after another verb phrase). Such pattern learning may include computing the time interval associated with each such transition, and creating a model therefrom. For each verb phrase, the corresponding application is associated with it. If the time interval is not standard, then a discrete time function series is created that can be used to predict future events. Entity-based action pattern discovery may be performed in a manner similar to that of topic-based action pattern discovery, except that the first grouping is done according to the entity (e.g., account ID, etc.) rather than topic.

Some embodiments further perform sentiment analysis. When search terms are analyzed, sentiment analysis may be applied on those terms and sentiments (e.g., negative, neutral, positive, etc.) are extracted therefrom. Additionally, any information that provides classifications (e.g., ratings, etc.) may also be extracted from the data. This may be used to tag action flows, which enables a better decision making process by separating out positive and negative workflows for a meaningful assessment.

The outputs of the above topic-based and entity-based action pattern discovery are decision trees that indicate how, given a topic or entity, actions are performed across applications. Some sample transitions that can be observed in these decision trees are: actions because of events from a given application; when an event comes from a first application (e.g., the first sales application), automatically perform an appropriate action (e.g., search and download competition material) on a second application (e.g., a web browser application); cascading workflows, where as a result of one or more notifications from a first application, workflows are triggered on a different set of applications. In some cases (e.g., like the enterprise suite of sales applications described above), it is possible to collect the decision trees across similar users (e.g., personas) to compute a more comprehensive decision tree. This comprehensive or combined decision tree may then be used for helping onboard newcomers or existing users with new workflows.

Figure 3:
FIG. 3 shows a table of notification messages from multiple applications in an illustrative embodiment.
Figure 5:
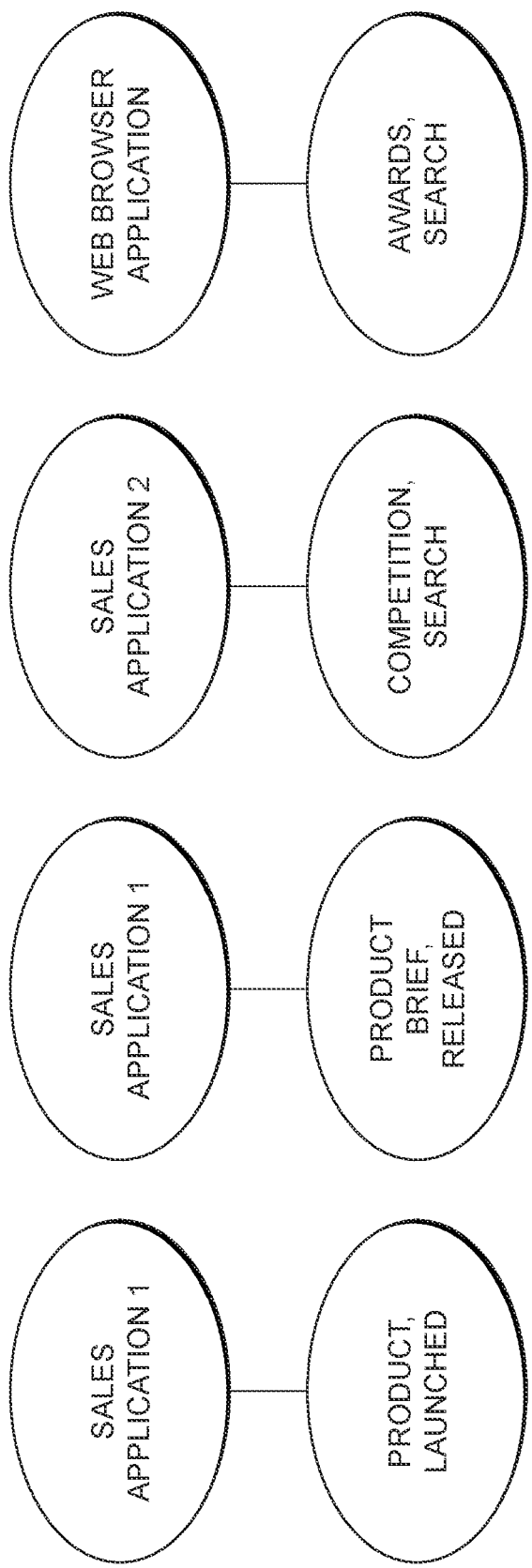
FIG. 5 shows cross-application discovery for a product pivoting on entities in an illustrative embodiment.
Figure 6:
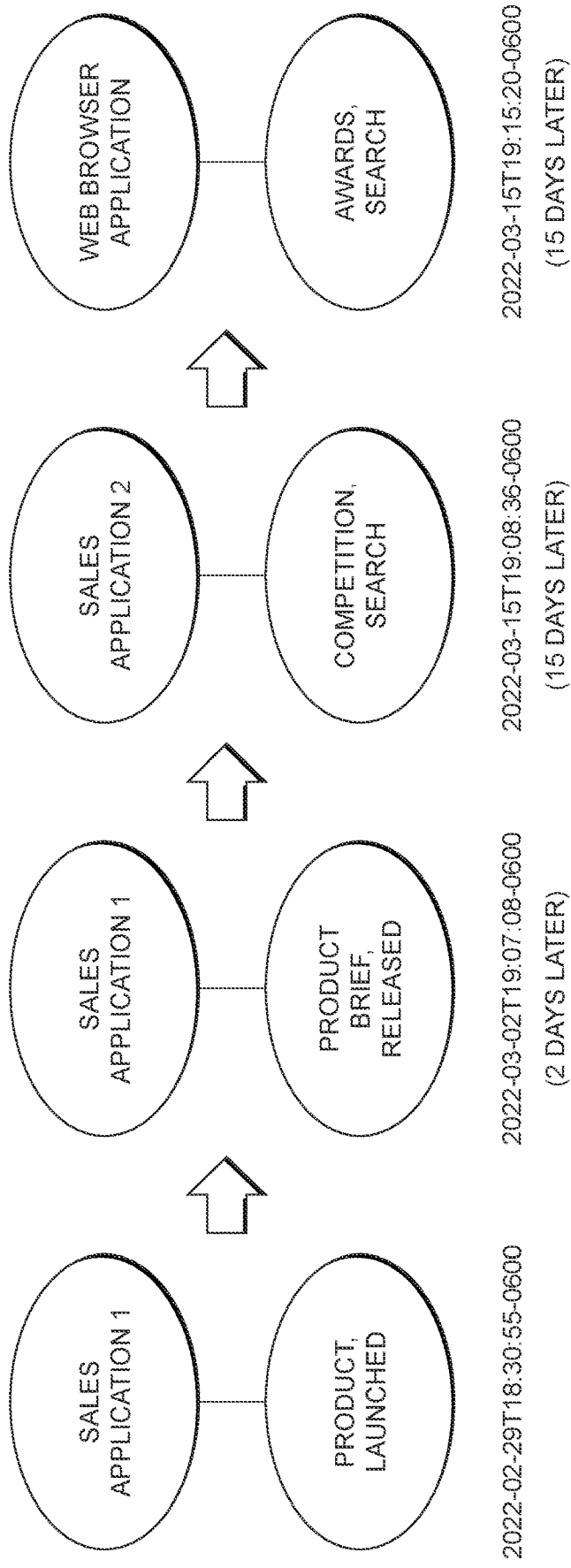
FIG. 6 shows transition times for the cross-application discovery for a product pivoting on entities in an illustrative embodiment.

FIG. 3 shows a table 300 of sample notifications collected from a set of applications (e.g., the enterprise suite of sales applications described above, as well as a web browser application). FIG. 4 shows a table 400, illustrating parsing of the notifications from the table 300 to add metadata, such as noun phrase, verb phrase, application, entity and topic fields. FIG. 5 illustrates cross-application discovery entity pivots 500 for the "product A" entity in the sample notifications of tables 300 and 400. The cross-application discovery 500 includes linked pairs of applications and their associated noun and verb phrases. FIG. 6 illustrates cross-application discovery transition times 600 for the "product A" entity in the sample notifications of tables 300 and 400.

Figure 7:
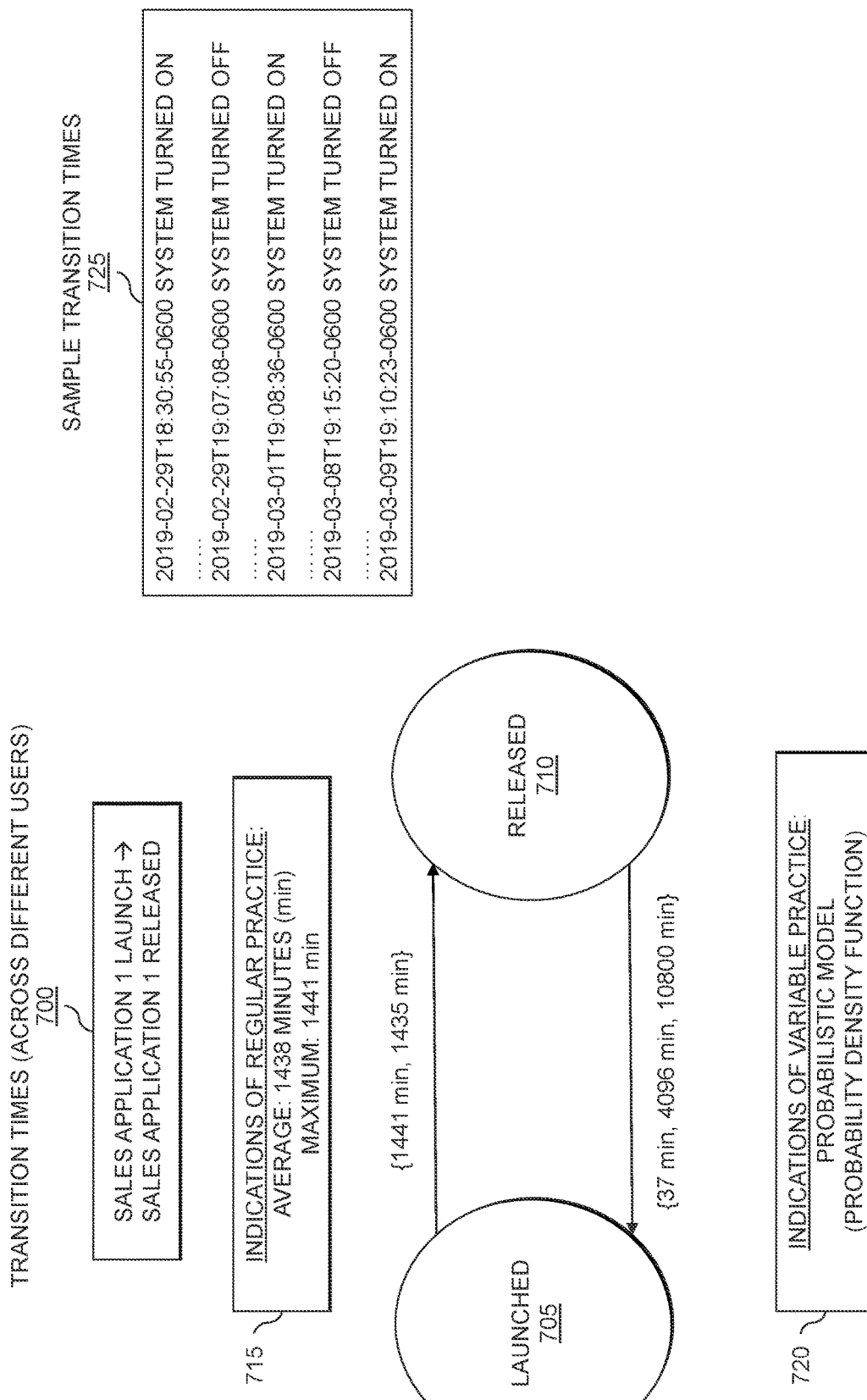
FIG. 7 shows determination of transition times across different users for transitions in an application in an illustrative embodiment.

FIG. 7 shows how transition times 700 across different users may be analyzed for the pivot between the first sales application actions of "launched" 705 (e.g., launch of "Product A") and "released" 710 (e.g., release of the product brief for "Product A"). FIG. 7 further shows indications of regular practice 715 and variable practice 720 for a set of sample transition times 725. The time at which transitions occur in the sample transition times 725 are used to estimate the ETA (estimated time of arrival), which may be the regular practice 715 or variable practice 720. The regular practice 715 may be computed or determined as the average transition time, the maximum transition time, etc. The variable practice 720 may be computed or determined according to a probabilistic model such as a probability density function. The transition times 700 may in some cases be local (e.g., to a specific enterprise customer or user) or global (e.g., across multiple enterprise customers or users).

Figure 8:
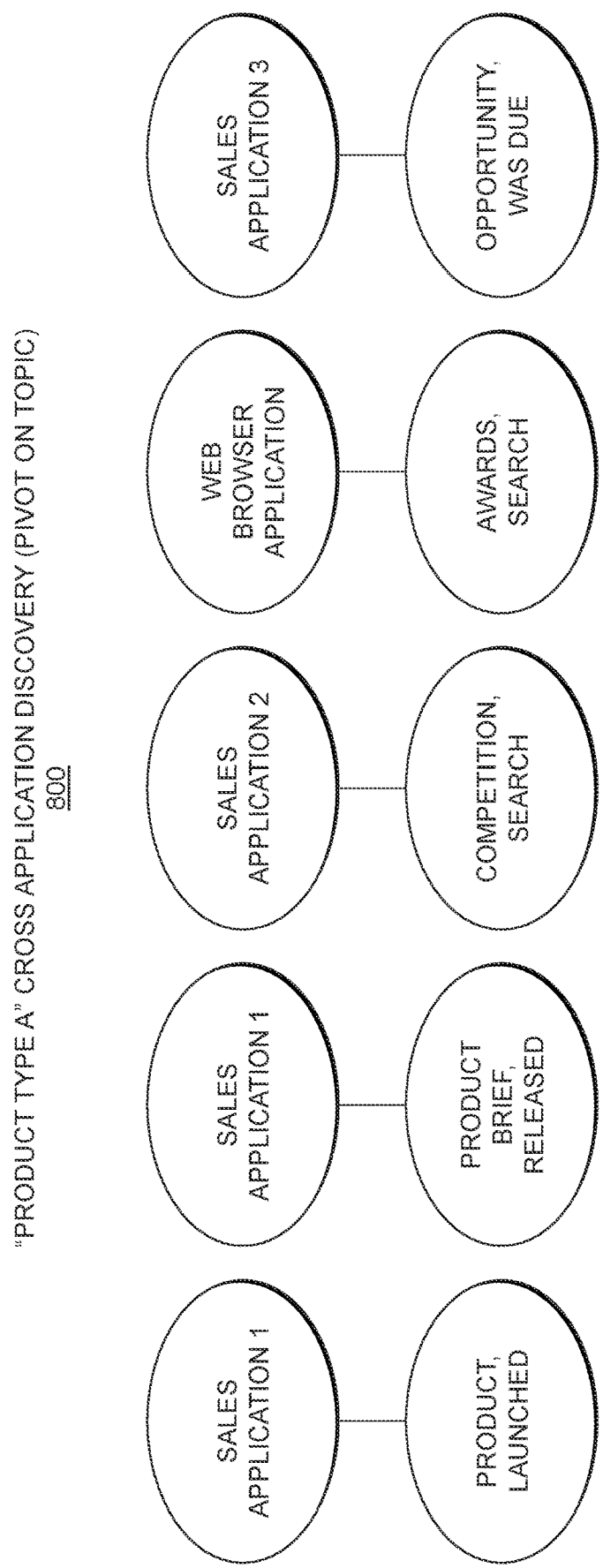
FIG. 8 shows cross-application discovery for a product type pivoting on topic in an illustrative embodiment.
Figure 9:
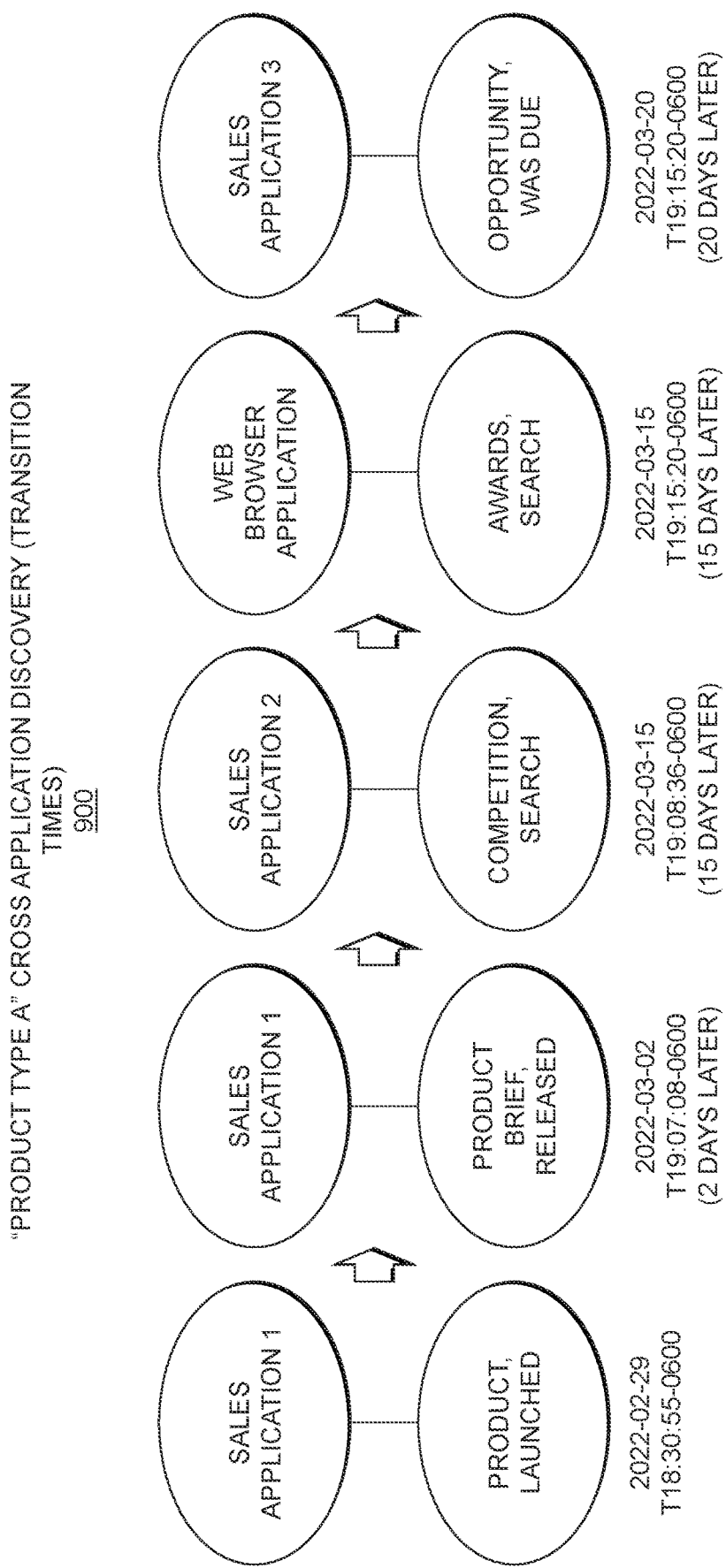
FIG. 9 shows transition times for the cross-application discovery for the product type pivoting on topic in an illustrative embodiment.

FIG. 8 illustrates cross-application discovery entity pivots 800 for the "product type A" topic in the sample notifications of tables 300 and 400. The cross-application discovery 800 includes linked pairs of applications and their associated noun and verb phrases. FIG. 9 illustrates cross-application discovery transition times 900 for the "product type A" topic in the sample notifications of tables 300 and 400. It should be noted that while the transition times in the FIGS. 6 and 9 examples are shown for one user or session for clarity of illustration, aggregating over multiple users, sessions and entities may be used to get a better understanding of usage patterns.

Figure 10:
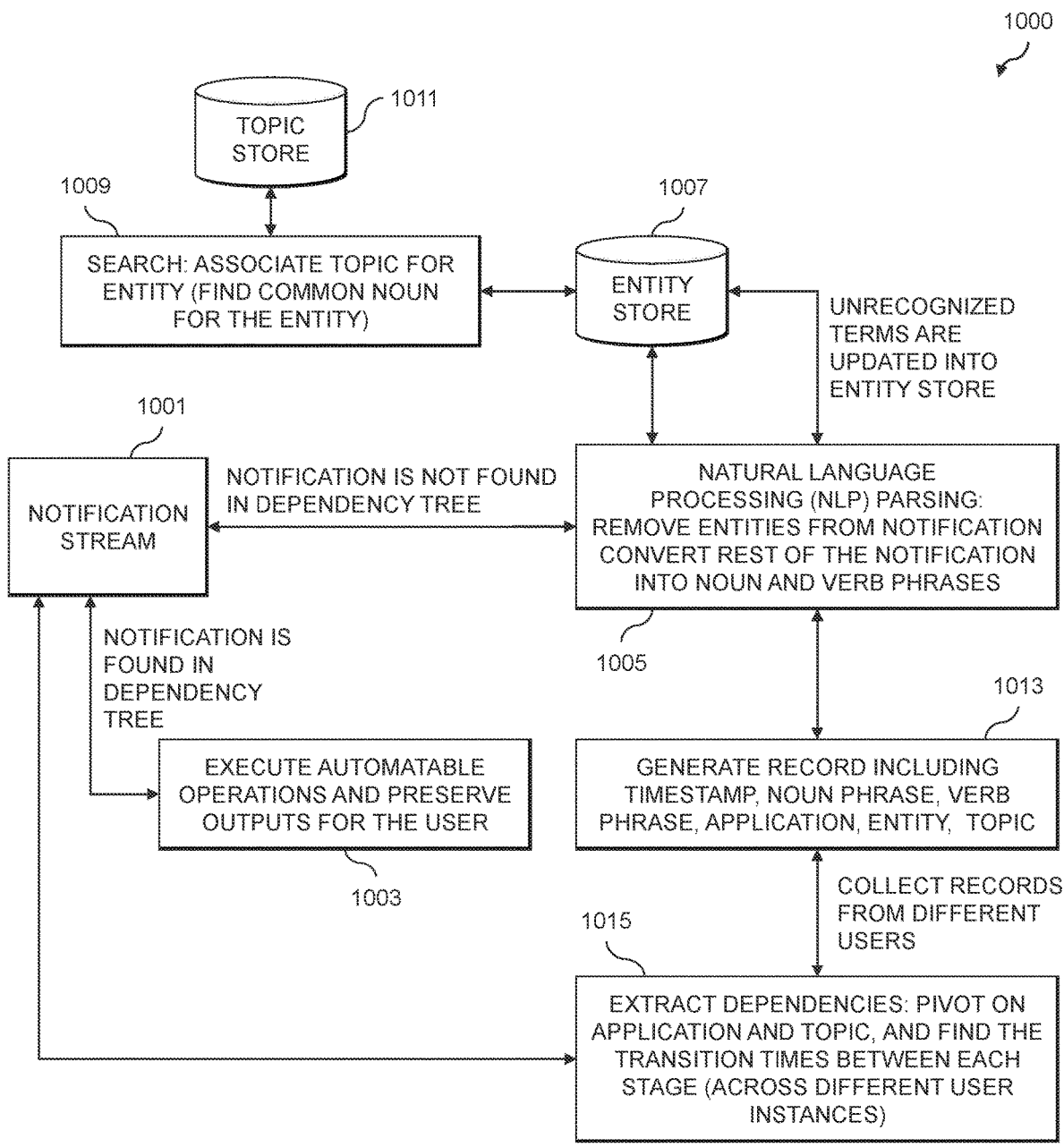
FIG. 10 shows a system flow for processing messages in a notification stream to determine cross-application dependencies in an illustrative embodiment.

FIG. 10 shows a system flow 1000 for a cross-application dependency discovery algorithm. A notification stream 1001 is provided as input, where individual notifications or messages in the notification stream 1001 may be processed in block 1003 or block 1005 depending on whether a particular notification or message is found in an available dependency tree. If the notification or message is found in the dependency tree, it is processed in block 1003 to execute all automatable operations while preserving outputs for the user. If the notification of message is not found in the dependency tree, it is processed in block 1005. Block 1005 includes NLP parsing, which removes entities from the notification or message and converts the rest of the notification or message into noun and verb phrases.

Figure 11:
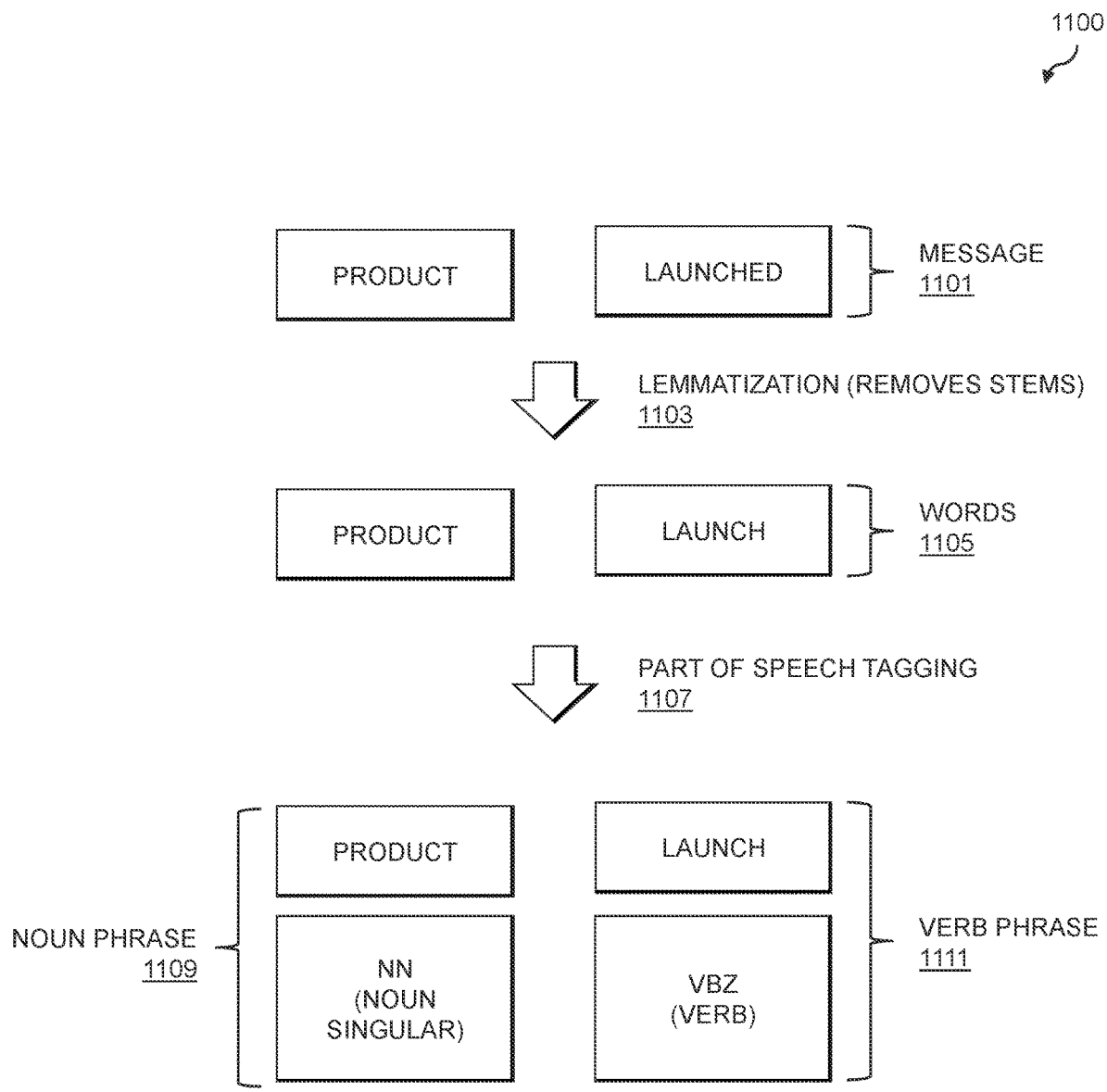
FIG. 11 shows a process flow for natural language processing of messages in a notification stream in an illustrative embodiment.

FIG. 11 shows a sample NLP process flow 1100, where an input message 1101 "product launched" is processed with lemmatization to remove stems, resulting in words 1105 (e.g., product and launch). Next, part of speech tagging 1107 is applied to tag the word "product" as a noun phrase 1109 (e.g., NN or noun singular) and to tag the word "launch" as a verb phrase 1111 (e.g., VBZ or verb). In some embodiments, an NLP toolkit is used (e.g., such as Python NLTK-NLP), which includes steps of getting antonyms and synonyms (e.g., from a lexical database of semantic relations between words, such as WordNet), tokenizing the text, installing, stemming, lemmatizing (e.g., from the lexical database of semantic relations between words, such as WordNet), stop word processing, and part of speech tagging.

Returning to FIG. 10, the NLP parsing block 1005 may utilize information from an entity store 1007, which can use search block 1009 for associating topics from a topic store 1011 with entities found in the notification or message being parsed in block 1005. Any unrecognized terms in the notification or message encountered during the NLP parsing may be updated into the entity store 1007. In block 1003, a record for the notification or message is generated, with the record including information such as a timestamp, noun phrase, verb phrase, application, entity and topic. Multiple records from different users are collected and processed in block 1015 to extract dependencies. The block 1015 may include pivoting on the application and topic, and finding the transition times between each stage (e.g., across different user instances). Such dependencies may be used in further processing of subsequent notifications and messages in the notification stream 1001 (e.g., by updating the decision tree). When new notifications or actions are detected, the process flow 1000 is executed where the updated decision tree is now examined and, based on the current state, the next state is predicted. If the next state was performed by the user (e.g., search, download, etc.), the same technique is then performed at the computed time interval associated with that state transition.

The technical solutions described herein provide various advantages in data processing, including for detecting and creating correlations across related events from multiple applications based on user actions. In some embodiments, the possible actions across different operations for multiple applications (e.g., on a user's device, such as a mobile device or other customer premise equipment) are learned, and used to automate such actions for the benefit of the user. Advantageously, the technical solutions identify actions as being related to specific entities (e.g., products) as well as generalization into topics which enables the system to respond to future new entities that belong to the same category (e.g., when a new server blade is launched, the same or similar operations used in previous server blade launches may be performed).

The technical solutions described herein enable an organization or other enterprise to improve the productivity of its employees or other users. The technical solutions can be deployed across a variety of products, including support products that provide support for service engineers in data centers. Such support products may include cloud-based support tools.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for message parsing to determine cross-application dependencies among actions from different applications will now be described in greater detail with reference to FIGS. 12 and 13. Although described in the context of system 100, these platforms may also be used to implement at least portions of other information processing systems in other embodiments.

Figure 12:
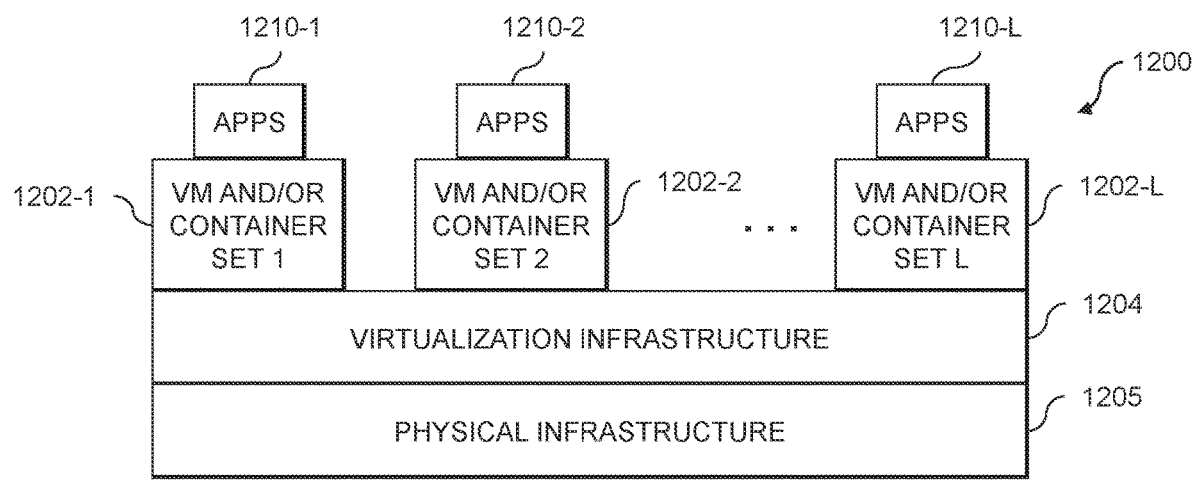
FIGS. 12 and 13 show examples of processing platforms that may be utilized to implement at least a portion of an information processing system in illustrative embodiments.
Figure 13:
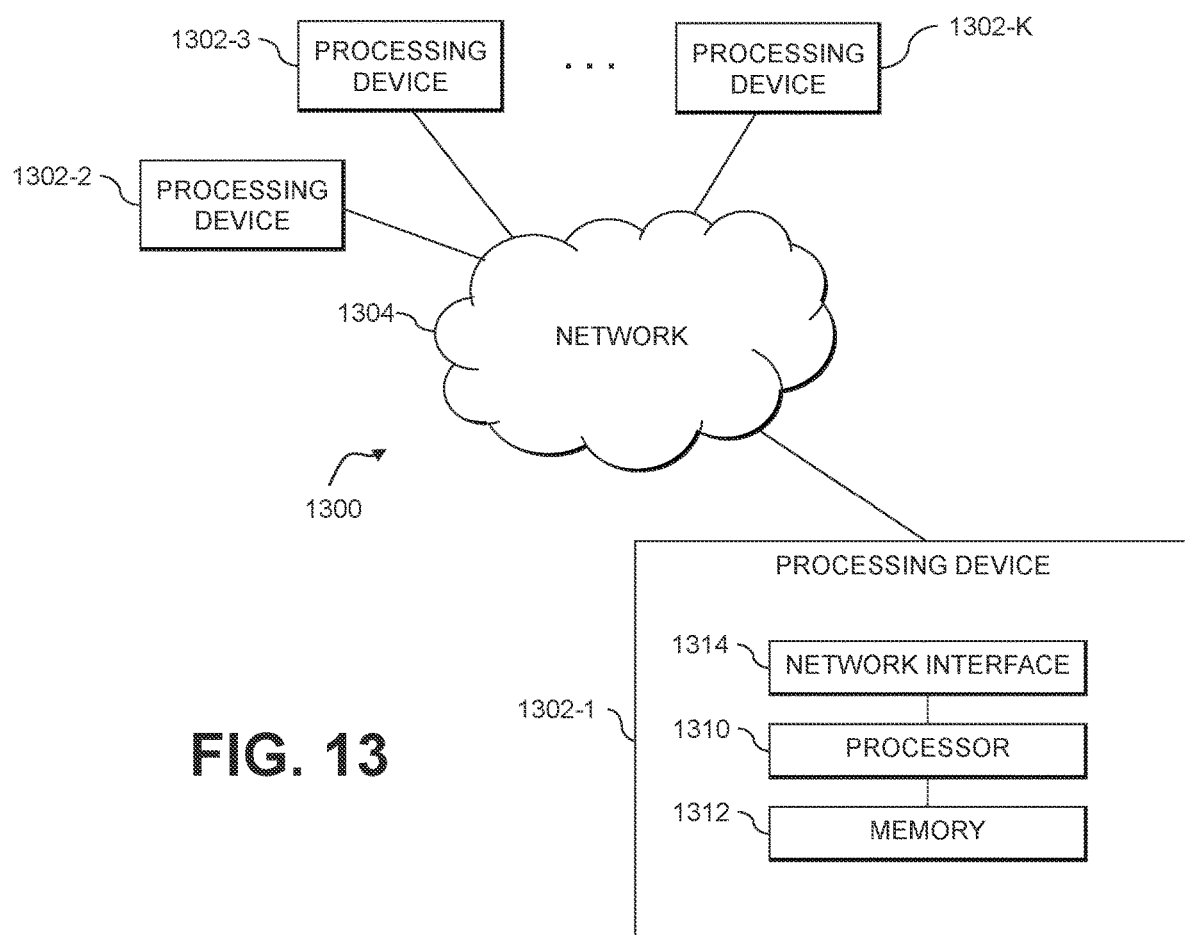

FIG. 12 shows an example processing platform comprising cloud infrastructure 1200. The cloud infrastructure 1200 comprises a combination of physical and virtual processing resources that may be utilized to implement at least a portion of the information processing system 100 in FIG. 1. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for message parsing to determine cross-application dependencies among actions from different applications as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, messages, notifications, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
obtaining a plurality of messages, the plurality of messages being associated with a plurality of actions, taken by two or more different user instances, in two or more applications running on at least one information technology asset in an information technology infrastructure;
parsing the plurality of messages to create a plurality of message records, a given one of the plurality of message records associated with a given one of the plurality of messages identifying one or more actions taken in a given one of the two or more applications, one or more entities for which the one or more actions in the given application were performed, and one or more of a plurality of topics that the given message is associated with;
determining cross-application dependencies specifying transition times between two or more of the plurality of actions across the two or more different user instances based at least in part on correlating at least one of entities and topics across two or more of the plurality of message records, a given one of the determined cross-application dependencies characterizing a relationship, for a given category of the one or more entities and a given topic of the plurality of topics, between a first one of the plurality of actions taken in a first one of the two or more applications and at least a second one of the plurality of actions taken in at least a second one of the two or more applications for a given entity and the given topic, the first one of the plurality of actions causing generation of a set of one or more notifications soliciting manual user input from at least one of the two or more different user instances; and
controlling performance of subsequent actions in at least one of the two or more applications based at least in part on the determined cross-application dependencies;
wherein controlling the performance of the subsequent actions in at least one of the two or more applications based at least in part on the given cross-application dependency comprises, responsive to detecting occurrence of an additional instance of the first action in an additional instance of the first application running on an additional information technology asset in the information technology infrastructure:
determining whether the additional instance of the first action is associated with the given category of the one or more entities and the given topic; and
responsive to determining that the additional instance of the first action is associated with the given category of the one or more entities and the given topic, automating initiation of an instance of the second action in an additional instance of the second application on the additional information technology asset at the transition time specified in the given cross-application dependency, wherein automating initiation of the instance of the second action in the additional instance of the second application on the additional information technology asset prunes the set of one or more notifications soliciting manual user input from at least one of the two or more different users instances which would otherwise be generated in response to the additional instance of the first action.

2. The apparatus of claim 1 wherein the one or more entities for which the one or more actions in the given application were performed comprise the at least one information technology asset, and wherein the one or more of the plurality of topics that the given message is associated with comprise an asset type of the at least one information technology asset.

3. The apparatus of claim 1 wherein the plurality of message records identify times at which the plurality of actions were taken in the two or more applications.

4. The apparatus of claim 3 wherein a given transition time of the given cross-application dependency is determined based at least in part on the identified times at which the first action and the second action were taken.

5. The apparatus of claim 1 wherein the plurality of messages are associated with two or more different users running instances of the two or more applications on at least two information technology assets in the information technology infrastructure.

6. The apparatus of claim 1 wherein determining the given cross-application dependency comprises:
identifying a first subset of the plurality of messages associated with at least one of the given topic and the given entity;
identifying, within the first subset of the plurality of messages, a second subset of the plurality of messages having a common noun phrase;
collecting verb phrases from the second subset of the plurality of messages; and
generating a model for transitions between the verb phrases collected from the second subset of the plurality of messages.

7. The apparatus of claim 6 wherein generating the model for transitions between the verb phrases collected from the second subset of the plurality of messages comprises creating a discrete time function series for modeling the transition times between the verb phrases collected from the second subset of the plurality of messages.

8. The apparatus of claim 6 wherein the model for transitions between the verb phrases collected from the second subset of the plurality of messages is further based at least in part on sentiment analysis of the verb phrases.

9. The apparatus of claim 1 wherein determining the cross-application dependencies comprises generating one or more decision trees, a given one of the decision trees characterizing, for at least one of the given topic and the given entity, how ones of the plurality of actions are performed across the two or more applications.

10. The apparatus of claim 9 wherein the given decision tree is generated for a given user.

11. The apparatus of claim 9 wherein the given decision tree comprises a comprehensive decision tree for a set of two or more users.

12. The apparatus of claim 1 wherein the two or more applications comprise two or more different enterprise applications of an enterprise operating the at least one information technology asset.

13. The apparatus of claim 1 wherein controlling performance of the subsequent actions in at least one of the two or more applications based at least in part on the determined cross-application dependencies comprises providing, via an artificial intelligence guided conversation system, recommendations for automating the performance of the subsequent actions in said at least one of the two or more applications.

14. The apparatus of claim 1 wherein the plurality of actions are taken as part of a task for at least one of servicing and configuration of the at least one information technology asset, and wherein controlling performance of subsequent actions comprises automating the subsequent actions in additional instances of at least one of the two or more applications running on additional information technology assets in the information technology infrastructure to automate at least one of servicing and configuration of the additional information technology assets.

15. A computer program product comprising a non-transitory processor-readable storage medium having stored therein program code of one or more software programs, wherein the program code when executed by at least one processing device causes the at least one processing device to perform steps of:
obtaining a plurality of messages, the plurality of messages being associated with a plurality of actions, taken by two or more different user instances, in two or more applications running on at least one information technology asset in an information technology infrastructure;
parsing the plurality of messages to create a plurality of message records, a given one of the plurality of message records associated with a given one of the plurality of messages identifying one or more actions taken in a given one of the two or more applications, one or more entities for which the one or more actions in the given application were performed, and one or more of a plurality of topics that the given message is associated with;
determining cross-application dependencies specifying transition times between two or more of the plurality of actions across the two or more different user instances based at least in part on correlating at least one of entities and topics across two or more of the plurality of message records, a given one of the determined cross-application dependencies characterizing a relationship, for a given category of the one or more entities and a given topic of the plurality of topics, between a first one of the plurality of actions taken in a first one of the two or more applications and at least a second one of the plurality of actions taken in at least a second one of the two or more applications for a given entity and the given topic, the first one of the plurality of actions causing generation of a set of one or more notifications soliciting manual user input from at least one of the two or more different user instances; and
controlling performance of subsequent actions in at least one of the two or more applications based at least in part on the determined cross-application dependencies;
wherein controlling the performance of the subsequent actions in at least one of the two or more applications based at least in part on the given cross-application dependency comprises, responsive to detecting occurrence of an additional instance of the first action in an additional instance of the first application running on an additional information technology asset in the information technology infrastructure:
determining whether the additional instance of the first action is associated with the given category of the one or more entities and the given topic; and responsive to determining that the additional instance of the first action is associated with the given category of the one or more entities and the given topic, automating initiation of an instance of the second action in an additional instance of the second application on the additional information technology asset at the transition time specified in the given cross-application dependency, wherein automating initiation of the instance of the second action in the additional instance of the second application on the additional information technology asset prunes the set of one or more notifications soliciting manual user input from at least one of the two or more different users instances which would otherwise be generated in response to the additional instance of the first action.

16. The computer program product of claim 15 wherein determining the cross-application dependencies comprises generating one or more decision trees, a given one of the decision trees characterizing, for at least one of the given topic and the given entity, how ones of the plurality of actions are performed across the two or more applications.

17. The computer program product of claim 15 wherein the plurality of actions are taken as part of a task for at least one of servicing and configuration of the at least one information technology asset, and wherein controlling performance of subsequent actions comprises automating the subsequent actions in additional instances of at least one of the two or more applications running on additional information technology assets in the information technology infrastructure to automate at least one of servicing and configuration of the additional information technology assets.

18. A method comprising:
obtaining a plurality of messages, the plurality of messages being associated with a plurality of actions, taken by two or more different user instances, in two or more applications running on at least one information technology asset in an information technology infrastructure;
parsing the plurality of messages to create a plurality of message records, a given one of the plurality of message records associated with a given one of the plurality of messages identifying one or more actions taken in a given one of the two or more applications, one or more entities for which the one or more actions in the given application were performed, and one or more of a plurality of topics that the given message is associated with;
determining cross-application dependencies specifying transition times between two or more of the plurality of actions across the two or more different user instances based at least in part on correlating at least one of entities and topics across two or more of the plurality of message records, a given one of the determined cross-application dependencies characterizing a relationship, for a given category of the one or more entities and a given topic of the plurality of topics, between a first one of the plurality of actions taken in a first one of the two or more applications and at least a second one of the plurality of actions taken in at least a second one of the two or more applications for a given entity and the given topic, the first one of the plurality of actions causing generation of a set of one or more notifications soliciting manual user input from at least one of the two or more different user instances; and
controlling performance of subsequent actions in at least one of the two or more applications based at least in part on the determined cross-application dependencies;
wherein controlling the performance of the subsequent actions in at least one of the two or more applications based at least in part on the given cross-application dependency comprises, responsive to detecting occurrence of an additional instance of the first action in an additional instance of the first application running on an additional information technology asset in the information technology infrastructure:
determining whether the additional instance of the first action is associated with the given category of the one or more entities and the given topic; and
responsive to determining that the additional instance of the first action is associated with the given category of the one or more entities and the given topic, automating initiation of an instance of the second action in an additional instance of the second application on the additional information technology asset at the transition time specified in the given cross-application dependency, wherein automating initiation of the instance of the second action in the additional instance of the second application on the additional information technology asset prunes the set of one or more notifications soliciting manual user input from at least one of the two or more different users instances which would otherwise be generated in response to the additional instance of the first action; and
wherein the method is performed by at least one processing device comprising a processor coupled to a memory.

19. The method of claim 18 wherein determining the cross-application dependencies comprises generating one or more decision trees, a given one of the decision trees characterizing, for at least one of the given topic and the given entity, how ones of the plurality of actions are performed across the two or more applications.

20. The method of claim 18 wherein the plurality of actions are taken as part of a task for at least one of servicing and configuration of the at least one information technology asset, and wherein controlling performance of subsequent actions comprises automating the subsequent actions in additional instances of at least one of the two or more applications running on additional information technology assets in the information technology infrastructure to automate at least one of servicing and configuration of the additional information technology assets.

* * * * *